Feb. 23, 1954 V. C. MACK 2,670,403

AUTOMATIC TELEPHONE

Filed Jan. 25, 1952 4 Sheets-Sheet 1

Victor C. Mack
INVENTOR.

BY Clarence A. O'Brien and Harvey B. Jacobson
Attorneys

Feb. 23, 1954

V. C. MACK

AUTOMATIC TELEPHONE 2,670,403

Filed Jan. 25, 1952

4 Sheets-Sheet 2

Victor C. Mack
INVENTOR.

BY Clarence A. O'Brien
and Harvey B. Jacobson
Attorneys

Victor C. Mack
INVENTOR.

BY Clarence A. O'Brien
and Harvey B. Jacobson
Attorneys

Victor C. Mack
INVENTOR.
BY Clarence A. O'Brien
and Harvey B. Jacobson
Attorneys Patented Feb. 23, 1954 2,670,403

UNITED STATES PATENT OFFICE 2,670,403

AUTOMATIC TELEPHONE

Victor C. Mack, Long Beach, Calif.

Application January 25, 1952, Serial No. 268,197

15 Claims. (Cl. 179—6)

This invention relates to an automatic telephone and particularly to a device to answer the telephone and record any message delivered thereover.

In many business concerns it is desirable to have someone answer the telephone at all hours of the day and night so that orders may be taken or deliveries noted at any time. However, it is frequently undesirable or uneconomical to have an operator at all times at the telephone, particularly where the establishment is small and the entire force is utilized in making deliveries or other contracts which are taken over the telephone, it is particularly undesirable to maintain one of the staff inoperative merely to answer the telephone.

The present invention provides an automatic device for answering the telephone and recording any message that may be delivered thereover. The device automatically activates the telephone receiver and transmitter in response to the normal signal thereto such as the ringing signal through the telephones and applies a recorded voice on the telephone telling the subscriber or caller that he has a predetermined time in which to make his wishes known. The timing device then permits the telephone circuit to be maintained open for a predetermined interval after which a limit switch will return the telephone to its inoperative condition until it is again signaled.

The invention is carried into practice by means of a voice recorder which is connected to the receiver of the telephone and is periodically energized in response to the signalling of the telephone to record any message presented within a predetermined timed interval. Likewise a record is provided which is connected to the telephone transmitter and upon the occurrence of a signal in the telephone the record will be connected to the transmitter to give instructions to the caller so that the transaction may be properly recorded.

It is accordingly an object of my invention to provide an improved automatic telephone.

It is a further object of my invention to provide a device which will answer and record a message received over the telephone.

It is a further object of my invention to provide a telephone control circuit which will open the telephone circuit for a predetermined interval after the call signal has been received thereby.

It is a further object of the invention to provide an improved connection for activating the telephone in response to a signal received thereby.

It is another object of the invention to provide a control system having a main actuating circuit and switch device responsive to a signal received by the telephone for closing the activating circuit into a supply circuit.

It is a further object of the invention to provide an automatic relay which is actuated in response to a signal received by a telephone.

Other objects and many of the attendant advantages of the present invention will be apparent from the following detailed description taken in conjunction with the accompanying drawings, in which.

Figure 1:
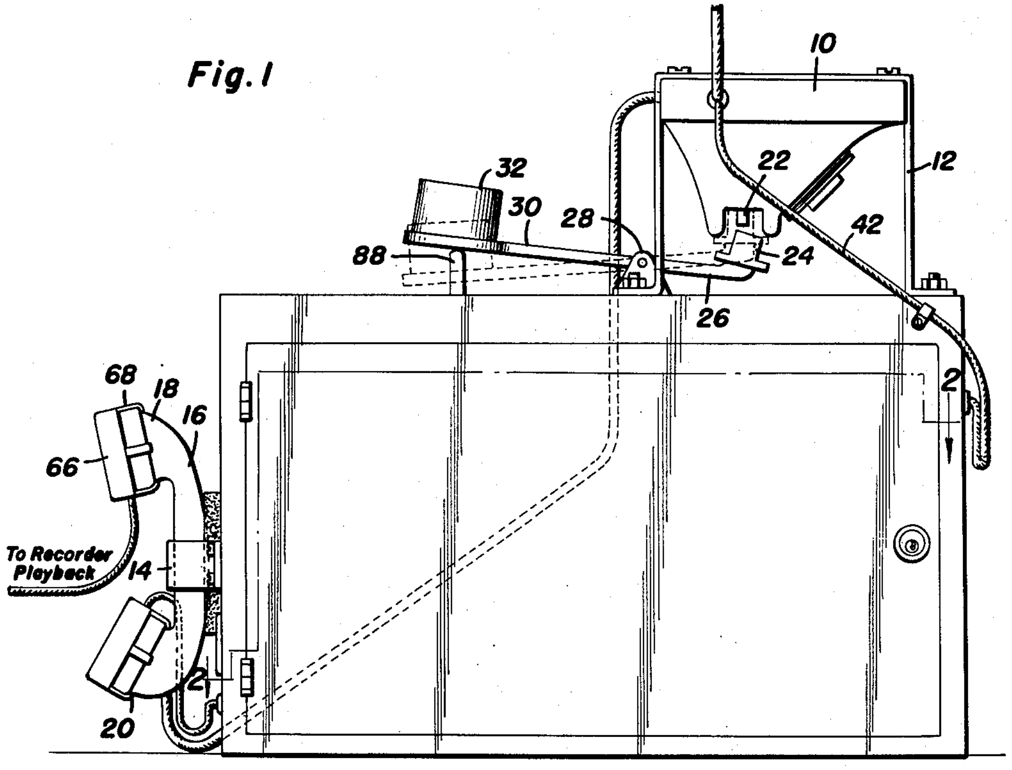
Figure 1 is an elevational view of the automatic telephone according to the invention.
Figure 4:
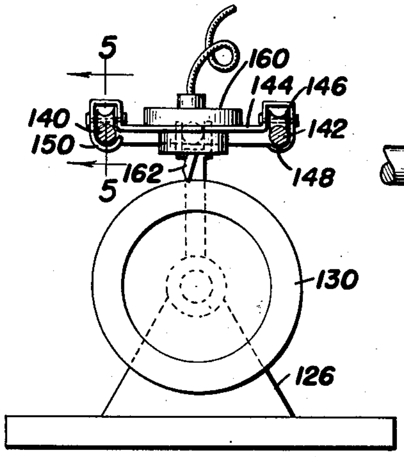
Figure 4 is a cross section showing the answering employment device taken substantially on the plane indicated by the line 4—4 of Figure 3.
Figure 5:
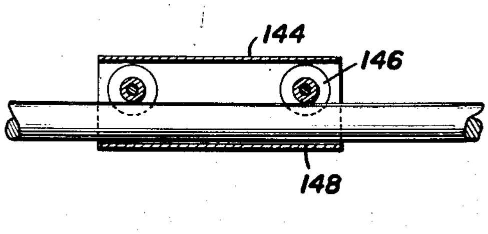
Figure 5 is an enlarged detail section of the timer carriage and taken substantially on the plane indicated by the line 5—5 of Figure 4.
Figure 2:
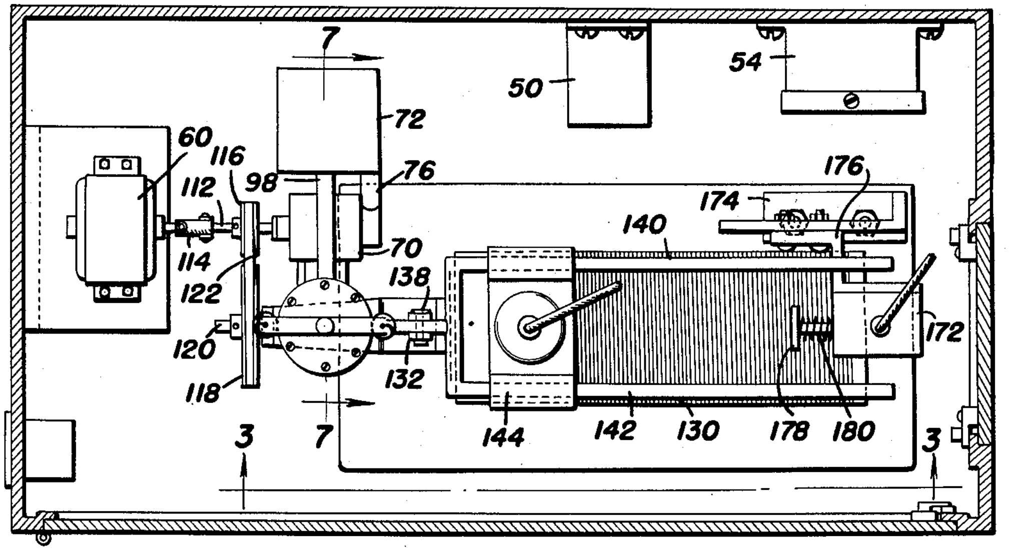
Figure 2 is an enlarged horizontal section through the controller according to the invention and taken substantially on the plane indicated by the line 3—3 of Figure 1.
Figure 7:
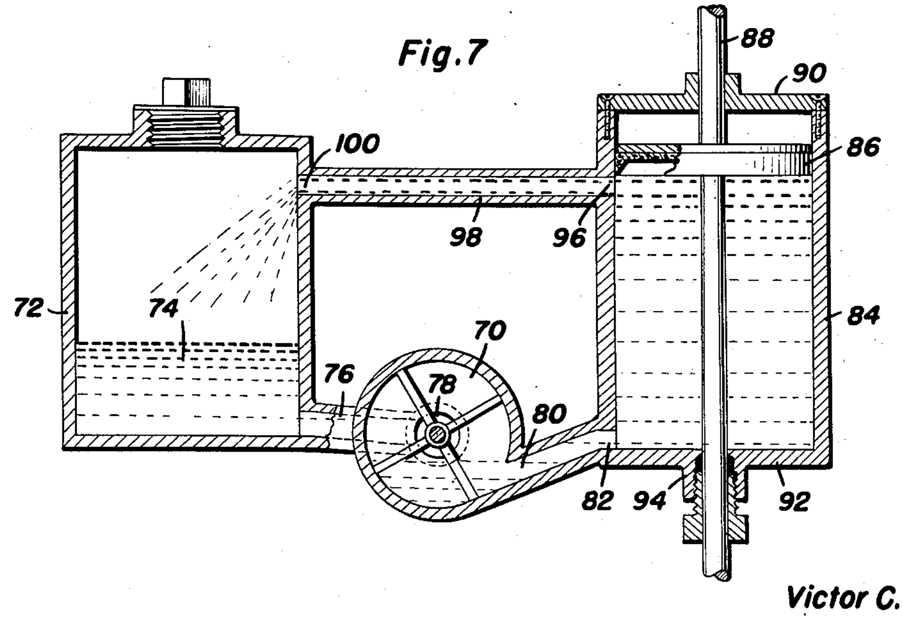
Figure 7 is an enlarged cross-section through the hydraulic actuating mechanism and taken substantially on the plane indicated by the line 7—7 of Figure 2.
Figure 3:
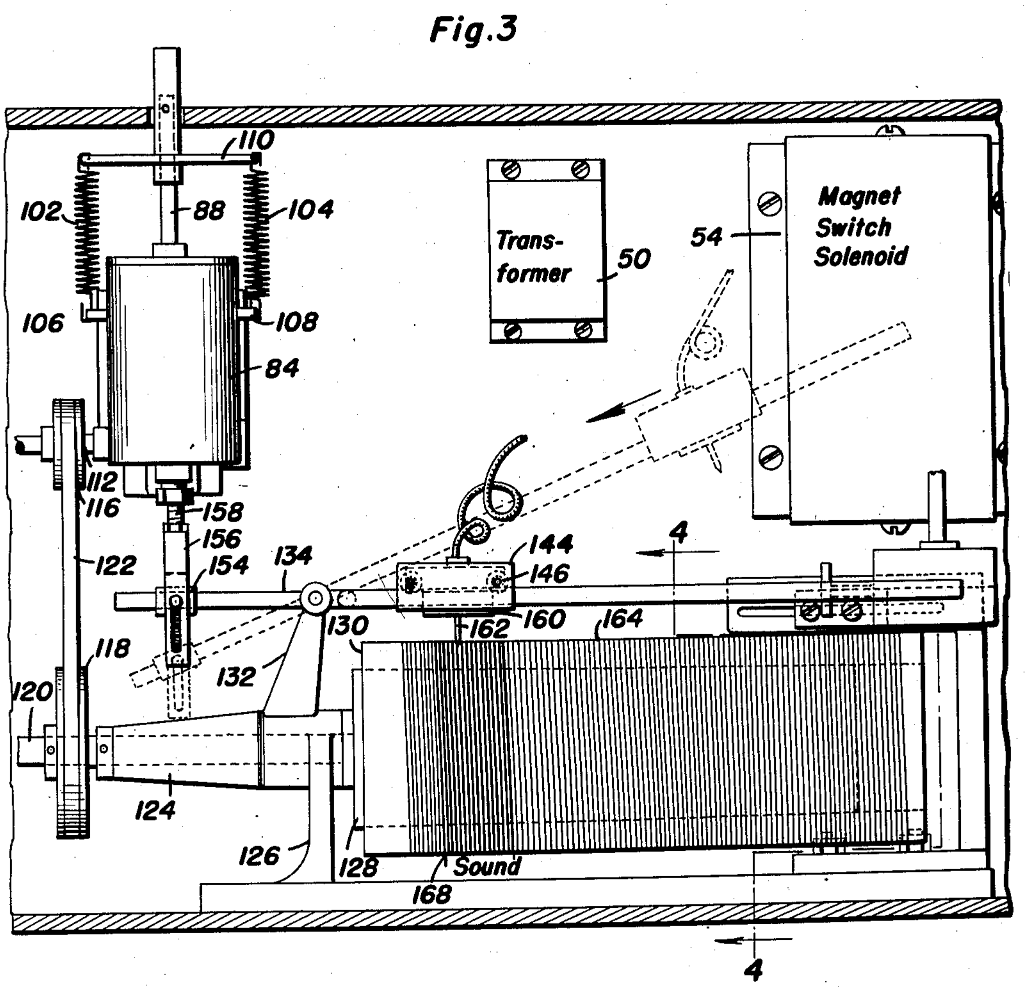
Figure 3 is an enlarged sectional elevation of a portion of the controller taken substantially on the plane indicated by the line 3—3 of Figure 2.
Figure 6:
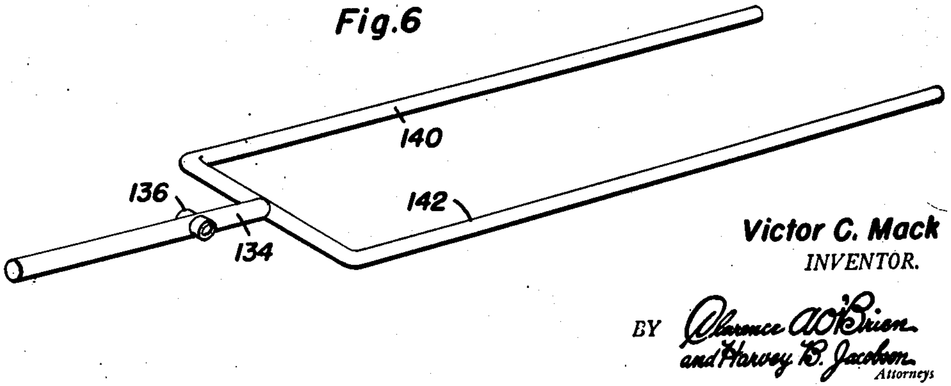
Figure 6 is an enlarged perspective of the track arm for supporting the carriage.
Figure 8:
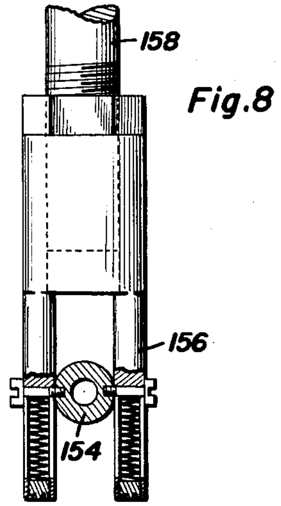
Figure 8 is an enlarged detail of the control connection for the primary carriage support.
Figure 9:
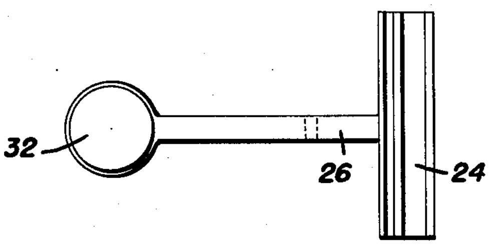
Figure 9 is an enlarged plan view of the control bar for the telephone.
Figure 10:
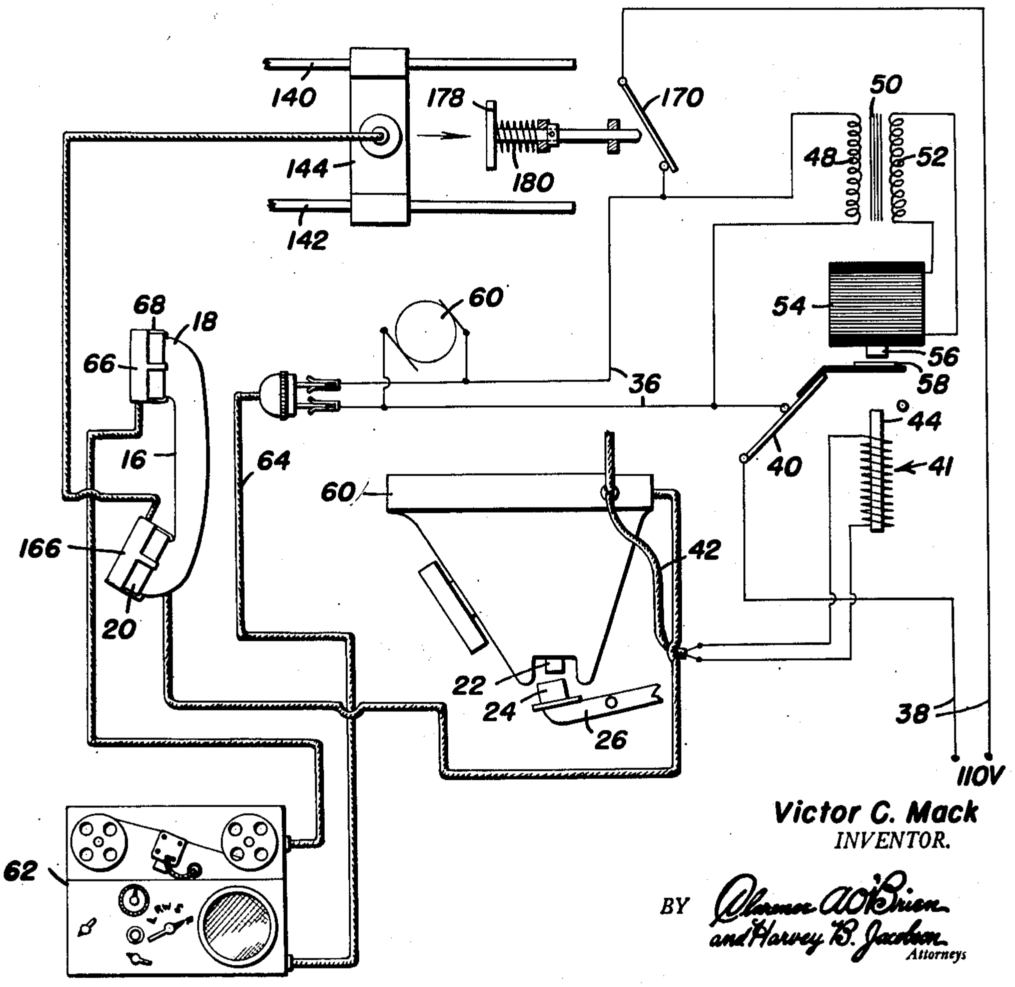
Figure 10 is a schematic wiring diagram for the automatic telephone.

According to the exemplary embodiment of the invention a telephone 10 is mounted in a support 12 and has the receiver and transmitter supported in a suitable bracket 14.

The telephone 10 here shown is of the modern dial type desk variety having a substantially square base and an upstanding housing enclosing the operating parts of the device and the head set 16 carrying the receiver 18 and the transmitter 20 is of the so-called French phone type. Obviously, the device can be applied to any type of telephone such as the old desk stand type in which the receiver is mounted on a prong which actuates the switches energizing the transmitter and receiver circuits of the phone.

In the telephone 10 as shown the control switch for activating the receiving and transmitting circuit is controlled by a switch actuator 22. Normally the switch actuator 22 is maintained depressed by the head set 16 which rests thereon. However, since the head set is supported in a bracket 14 independent of the telephone stand it is necessary to provide means for normally maintaining the switch actuator 22 depressed so that the telephone is in an inactive condition and the receiver and transmitter are disconnected from the telephone circuit. For this purpose a depressor bar 24 is mounted on a pivoted arm 26 which is mounted on a bracket 28 preferably forming a part of the support 12.

The arm 26 pivoted in the bracket 28 has a longitudinally extending actuating portion 30 on which is mounted a weight 32 which normally biases the arm 30 so that the bar 24 is in position to depress the actuator 22.

An actuating circuit 36 is connected to a supply circuit 38 by means of the control switch 40. The relay 41 is energized by a pick-up circuit 42 which is responsive to the transmission of signal current such as the bell ringing currents to the telephone 10. Obviously any desired pick-up either mechanical or electrical may be utilized to transfer the bell ringing signal to the relay 41.

The armature 44 of the relay 41 will be actuated by means of the picked up signal responsive to the transmitted signal to the telephone and will be energized to close the starting switch 40. Closing the starting switch 40 will energize the activating circuit 36 which in turn will activate the primary winding 48 of a transformer 50 having a secondary winding 52 the terminals of which are connected to the magnetic device 54. The armature 56 or the magnetic device 54 will attract the disc 58 and maintain the switch 40 in closed condition.

In addition to the holding circuit maintaining the switch in closed condition the energizing circuit 36 will energize an operating motor 60 which will actuate various portions of the system as will presently be described. Likewise the voice recorder 62 which may be of any standard or commercial make is connected to the actuating circuit 36 by means of a connection 64. The pick up circuit 66 on the voice recorder 62 being clamped to the receiver 18 by any suitable clamping device 68. It will therefore be apparent that when the actuating circuit 36 is energized the voice recording device 62 will be energized so that if any message is delivered to the pick up circuit 66 it will be recorded by the voice recording device.

The motor 60 energized from the actuating circuit 36 is connected to a control device for actuating the arm 26 to release the switch actuating member 22 and energize the transmitter and receiver circuit on the telephone so that the receiver 18 will deliver any message which may be transmitted over the telephone to the voice recorder 62 so that it may be preserved and played back at any later time.

The actuating system for controlling the telephone comprises a pump 70 which is driven by the motor 60. A reservoir 72 contains a quantity of operating fluid 74 and has an outlet 76 connected to the intake 78 on the pump 70. The output 80 of the pump 70 is connected to the inlet 82 of a fluid cylinder 84 in which there is a sliding piston 86 to which is connected a piston rod 88. The piston rod 88 extending through both ends 90 and 92 of the cylinder and having a gland 94 to prevent the escape of fluid along the piston rod. The by-pass opening 96 is provided in the cylinder 84 and connected by a conduit 98 to an inlet passage 100 for the storage 74. Energization of the motor 60 by closing the switch 40 will cause rotation of the motor 60 to rotate the pump 70 to pump fluid 74 from the reservoir 70 into the lower portion of the cylinder 84 which will elevate the piston 86 until the piston 86 uncovers the by-pass port 96 and permits the fluid to be by-passed into the reservoir 72. The utilization of the by-pass 96 provides that the pump may run for any desired interval and after the piston has moved up to uncover the by-pass port it will stop its motion and will maintain its relative position until the pump has ceased to operate. Spring members 102 and 104 connected between the ears 106 and 108 on the cylinder 84 and the yoke 110 fixed on the piston rod 88. The fluid pressure in the cylinder 84 moves the piston 86 against the tension of the springs 102 and 104 so that the piston is constantly resiliently urged towards the lower portion of the cylinder 84. Consequently, when the motor 60 is deenergized the springs will cause a return of the fluid through the pump 70 to the reservoir and cause a retraction on the piston rod 88 to a predetermined lower position.

The extension of the piston rod 88 is designed to contact the end 30 of the arm 26 and lift the end 30 against the bias weight 32 so that the actuating bar is lifted away from the actuating means 22 so that the connector switch of the telephone will connect in the circuit of the receiver and transmitter to activate the same. Preferably, the motor 60 is connected to the pump 70 by means of a drive shaft 112 and a flexible coupling 114. The sheave 116 is placed on the shaft 112 and connected to a sheave 118 is a shaft 120 by means of a belt 122. The shaft 120 is mounted in a longitudinally extending bushing 124 mounted on a bracket 126. A record holder 128 is mounted on the shaft 120 and is herein shown of the cylindrical type although it is obvious that a turntable or other record support could be utilized. A record 130 is mounted on the record holder 128 and turns therewith. A bracket 132 is secured on the bushing 124. A track arm 134 having a pivot bushing 136 is pivotally connected to the top of the bracket 132 by means of a pivot pin 138 one end of the track arm 134 is provided with a bifurcated section having tracks 140 and 142. The carriage 144 is provided with a plurality of wheels 146 which engage the tracks 140 and 142 so that the carriage is rotatably slidable along the tracks. The carriage 144 is provided with inturned guide members 148 and 150 which extend under and embrace the tracks 140 and 142 so that the carriage 144 cannot be readily dislodged from the tracks 140 and 142. The opposite end of the arm 134 extends through a guide bushing 154 which is gimbal mounted on the yoke 156 secured on the bottom end 158 of the piston rod 88.

A reproducer 160 mounted in the carriage 144 has a needle 162 which engages the sound track 164 on the record 130. Energization of the motor 60 causes rotation of the shaft 112 and the sheaves 116 and 118 will start the rotation of the shaft 120 which carries the holder 128 and the record cylinder 130. The forcing of the fluid under pressure into the cylinder 84 moving the piston 86 upward moves upward the yoke 156 and causes the arm 134 to pivot about the pin 138 and lowers the tracks 140 and 142 in substantially parallelism with the record 130. The needle 152 then engages the voice track 164 and rotation of the record causes the carriage 144 to traverse longitudinally along the tracks 140 and 142. The pick up box 160 is connected by means of connections 166 to the transmitter 20 of the telephone 10. As the needle 162 moves along the voice track 168 instructions as to how to proceed will be transmitted by that portion of the sound track 168 which has a message thereon. For example, the message may say that the caller may now have so many seconds to record message after which the phone will be disconnected. As soon as these remarks have been duly transmitted the needle 162 will continue along the silent voice track 164 and cause the carriage 144 to continue servicing the tracks 140 and 142.

The limit switch 170 is mounted in a box 172 which is in turn mounted on a bracket 174 where longitudinal adjustments are allowed. The switch box 172 is mounted on an arm 176 so that the box is substantially parallel to the top of the cylinder 130. An actuating member 178 is maintained in withdrawn position by means of a spring 180 and is slidably mounted in the box 172 for actuating the switch 170. The actuating pin 178 is mounted in the path of progress of the carriage 144 so that the needle carries the carriage 144 along the tracks 140 and 142 the carriage will contact the stop 178 and actuate the switch 170 to deenergize the actuating circuit 36. Opening of the switch 170 will deenergize the holding circuit to the magnetic device 54 and switch 40 will drop out.

Obviously, the time which the telephone circuits are energized can be controlled by mounting the switch box at any desired point along the bracket 174 so that the time of travel of the carriage 144 till it engages the actuating member 178 can be readily adjusted.

Deenergization of the circuit 36 will allow the piston 86 to return under the tension of the springs 102 and 104 align the arm 26 to fall under the bias weight and the bar 24 will contact the actuating members 22 to de-activate the receiver and transmitter of the telephone and place it in condition to receive another signal. At the same time the yoke 156 will be depressed causing the track arm 134 to pivot about the pin 138 so that the tracks 140 and 142 will be at an inclined position. This will release the needle 162 from the sound track 164 and the carriage 144 will move along the tracks 140 and 142 under the influence of gravity so that it will return to the starting point so that it will re-initiate its course whenever a signal causes activation of the cylinder 84.

In the operation of the automatic telephone a suitable message will be placed on that portion 168 of the sound track 164 which is to be utilized as an instruction portion. The telephone is arranged in the necessary supports and the pick-up arranged with the signal circuit of the telephone. Upon the occurrence of the expected signal the relay 42 will close the switch 40 and activate the motor 60 and also energize the recording device 62. The motor 60 through the pump 70 will cause the actuation of the control arm 26 and the track arm 134 so that the instructions will be given over the telephone and after a predetermined interval the phone will be disconnected.

It will be evident that suitable instruction delivered over the telephone will allow the caller to deliver any suitable message which will be recorded on the device 62 for a play back at any future time. Obviously, the timing can be controlled as may be desired by simply adjusting the position of the contact element which is placed in the path of the carriage 144.

It will thus be seen that the present invention provides an extremely convenient and practical system for answering the telephone and recording a message in the interest of any attendant therewith.

For purpose of exemplification a particular embodiment of the invention has been disclosed, and described according to the best present understanding thereof, however, it will be apparent to those skilled in the art that changes and modifications can be made therein without departing from the true spirit of the invention.

Having described the invention, what is claimed as new is:

1. An automatic telephone device comprising a telephone support, an actuating circuit, a control switch for said circuit, said control switch being actuated by the flow of signal energy to said telephone, a fluid cylinder, a piston movable in said cylinder, a control arm for said telephone, said piston being operatively connected to said arm, means energized from said circuit supplying fluid to said cylinder, a cylinder having a spiral voice track thereon, a needle for following said track, a carriage supporting said needle, a carriage track pivotally mounted adjacent to said cylinder, said piston being operatively connected to said track, said piston when actuated lowering said needle into operative relation with said cylinder, rotation of said cylinder traversing said carriage along said track, a limit switch, said carriage engaging said limit switch to deenergize said actuating circuit.

2. An automatic telephone device comprising a telephone support, an actuating circuit, a control switch for said circuit, said control switch being actuated by the flow of signal energy to said telephone, a fluid cylinder, a piston movable in said cylinder, a control arm for said telephone, said piston being operatively connected to said arm, means energized from said circuit supplying fluid to said cylinder, a cylinder having a spiral voice track thereon, a needle for following said track, a carriage supporting said needle, a carriage track pivotally mounted adjacent to said cylinder, said piston being operatively connected to said track, said piston when actuating lowering said needle into operative relation with said cylinder, rotation of said cylinder traversing said carriage along said track, a limit switch, said carriage engaging said limit switch to deenergize said actuating circuit, a recording on a portion of said sound track, means operative to transmit said recording to the transmitter of said telephone.

3. An automatic telephone device comprising a telephone support, an actuating circuit, a control switch for said circuit, said control switch being actuated by the flow of signal energy to said telephone, a fluid cylinder, a piston movable in said cylinder, a control arm for said telephone, said piston being operatively connected to said arm, means energized from said circuit supplying fluid to said cylinder, a cylinder having a spiral voice track thereon, a needle for following said track, a carriage supporting said needle, a carriage track pivotally mounted adjacent to said cylinder, said piston being operatively connected to said track, said piston when actuating lowering said needle into operative relation with said cylinder, rotation of said cylinder traversing said carriage along said track, a limit switch, said carriage engaging said limit switch to deenergize said actuating circuit, a recording on a portion of said sound track, means operative to transmit said recording to the transmitter of said telephone, a recording device, means connecting said recording device to the receiver of said telephone, said recording device being energized from said actuating circuit.

4. An automatic telephone device comprising a telephone support, a central arm controlling the telephone activating switch, said arm being biased to maintain said telephone inactive, a relay activated by the transmission of signal energy to said telephone, an actuating circuit for said device, a switch operated by said relay to energize said actuating circuit, a motor connected to be energized by said actuating circuit, a piston, means driven by said motor moving said piston in a predetermined direction, a record device, a driving connection between said motor and said record device, a reproducing device, a carriage supporting said reproducing device, a pivoted track arm, said carriage being mounted on said track arm, an operative connection between said piston, said control arm and said track arm, movement of said piston moving said control arm to activate the receiver and transmitter of said telephone, said piston pivoting said track arm to engage said reproducing device with said record device, a connection from said reproducing device to the transmitter of said telephone operation of said record device traversing said carriage along said arm, a limit switch, said carriage engaging said limit switch to deenergize said actuating circuit.

5. An automatic telephone device comprising a telephone support, a central arm controlling the telephone activating switch, said arm being biased to maintain said telephone inactive, a relay activated by the transmission of signal energy to said telephone, an actuating circuit for said device, a switch operated by said relay to energize said actuating circuit, a motor connected to be energized by said actuating circuit, a piston, means driven by said motor moving said piston in predetermined direction, a record device, a driving connection between said motor and said record device, a reproducing device, a carriage supporting said reproducing device, a pivoted track arm, said carriage being mounted on said track arm, an operative connection between said piston, said control arm and said track arm, movement of said piston moving said control arm to activate the receiver and transmitter of said telephone, said piston pivoting said track arm to engage said reproducing device with said record device, a connection from said reproducing device to the transmitter of said telephone operation of said record device traversing said carriage along said arm, a limit switch, said carriage engaging said limit switch to deenergize said actuating circuit, said piston being operative upon deenergization of said activating circuit to release said control arm, and pivot said track arm to inoperative position.

6. An automatic telephone device comprising a telephone support, a central arm controlling the telephone activating switch, said arm being biased to maintain said telephone inactive, a relay activated by the transmission of signal energy to said telephone, an actuating circuit for said device, a switch operated by said relay to energize said actuating circuit, a motor connected to be energized by said actuating circuit, a piston, means driven by said motor moving said piston in predetermined direction, a record device, a driving connection between said motor and said record device, a reproducing device, a carriage supporting said reproducing device, a pivoted track arm, said carriage being mounted on said track arm, an operative connection between said piston, said control arm and said track arm, movement of said piston moving said control arm to activate the receiver and transmitter of said telephone, said piston pivoting said track arm to engage said reproducing device with said record device, a connection from said reproducing device to the transmitter of said telephone operation of said record device traversing said carriage along said arm, a limit switch, said carriage engaging said limit switch to deenergize said actuating circuit, said piston being operative upon deenergization of said activating circuit to release said control arm, and pivot said track arm to inoperative position, said carriage being roller mounted on said track arm, said track arm being raised at an angle whereby said carriage returns to the starting point.

7. An automatic telephone device comprising a telephone support, a central arm controlling the telephone activating switch, said arm being biased to maintain said telephone inactive, a relay activated by the transmission of signal energy to said telephone, an actuating circuit for said device, a switch operated by said relay to energize said actuating circuit, a motor connected to be energized by said actuating circuit, a piston, means driven by said motor moving said piston in a predetermined direction, a record device, a driving connection between said motor and said record device, a reproducing device, a carriage supporting said reproducing device, a pivoted track arm, said carriage being mounted on said track arm, an operative connection between said piston, said control arm and said track arm, movement of said piston moving said control arm to activate the receiver and transmitter of said telephone, said piston pivoting said track arm to engage said reproducing device with said record device, a connection from said reproducing device to the transmitter of said telephone operation of said record device traversing said carriage along said arm, a limit switch, said carriage engaging said limit switch to deenergize said actuating circuit, a recording device, said recording device being energized from said activating circuit, a connection from the receiver of said telephone to said recorder.

8. An automatic telephone device comprising a telephone support, a relay energized by transmission of signal energy to said telephone, a switch operated by said relay, an actuating circuit, said switch connecting said actuating circuit to a supply line, a transformer connected to said actuating circuit, a magnetic device energized through said transformer, said magnetic device holding said switch in operated position, a motor energized from said actuating circuit, a fluid reservoir, a fluid cylinder, a piston in said cylinder, a fluid pump driven by said motor, said pump transforming fluid from said reservoir to said cylinder, the pressure of said fluid driving said piston in said cylinder, a control arm in operative engagement with the telephone activating switch, said arm being biased into position to maintain said telephone inactive, said piston engaging said arm, a record player, a record mounted in said player, a carriage, a reproducer mounted on said carriage, a track arm, said carriage being mounted on said track arm, said track arm being pivoted adjacent said record, said piston having operative engagement with said control arm and said track arm whereby movement of said piston pivots said track arm to engage said reproducer with said record and move said control arm to activate the transmitter and receiver of said telephone.

9. An automatic telephone device comprising a telephone support, a relay energized by transmission of signal energy to said telephone, a switch operated by said relay, an actuating circuit, said switch connecting said actuating circuit to a supply line, a transformer connected to said actuating circuit, a magnetic device energized through said transformer, said magnetic device holding said switch in operated position, a motor energized from said actuating circuit, a fluid reservoir, a fluid cylinder, a piston in said cylinder, a fluid pump driven by said motor, said pump transforming fluid from said reservoir to said cylinder, the pressure of said fluid driving said piston in said cylinder, a control arm in operative engagement with the telephone activating switch, said arm being biased into position to maintain said telephone inactive, said piston engaging said arm, a record player, a record mounted in said player, a carriage, a reproducer mounted on said carriage, a track arm, said carriage being mounted on said track arm said track arm being pivoted adjacent said record, said piston having operative engagement with said control arm and said track arm whereby movement of said piston pivots said track arm to engage said reproducer with said record and move said control arm to activate the transmitter and receiver of said telephone, said reproducer being connected to deliver any message on said record into said transmitter.

10. An automatic telephone device comprising a telephone support, a relay energized by transmission of signal energy to said telephone, a switch operated by said relay, an actuating circuit, said switch connecting said actuating circuit to a supply line, a transformer connected to said actuating circuit, a magnetic device energized through said transformer, said magnetic device holding said switch in operated position, a motor energized from said actuating circuit, a fluid reservoir, a fluid cylinder, a piston in said cylinder, a fluid pump driven by said motor, said pump transforming fluid from said reservoir to said cylinder, the pressure of said fluid driving said piston in said cylinder, a control arm in operative engagement with the telephone activating switch, said arm being biased into position to maintain said telephone inactive, said piston engaging said arm, a record player, a record mounted in said player, a carriage, a reproducer mounted on said carriage, a track arm, said carriage being mounted on said track arm, said track arm being pivoted adjacent said record, said piston having operative engagement with said control arm and said track arm whereby movement of said piston pivots said track arm to engage said reproducer with said record and move said control arm to activate the transmitter and receiver of said telephone, said reproducer being connected to deliver any message on said record into said transmitter, a recording device connected to record any message delivered to said receiver, said recorder being energized from said activating circuit.

11. An automatic telephone device comprising a telephone support, a relay energized by transmission of signal energy to said telephone, a switch operated by said relay, an actuating circuit, said switch connecting said actuating circuit to a supply line, a transformer connected to said actuating circuit, a magnetic device energized through said transformer, said magnetic device holding said switch in operated position, a motor energized from said actuating circuit, a fluid reservoir, a fluid cylinder, a piston in said cylinder, a fluid pump driven by said motor, said pump transforming fluid from said reservoir to said cylinder, the pressure of said fluid driving said piston in said cylinder, a control arm in operative engagement with the telephone activating switch, said arm being biased into position to maintain said telephone inactive, said piston engaging said arm, a record player, a record mounted in said player, a carriage, a reproducer mounted on said carriage, a track arm, said carriage being mounted on said track arm, said track arm being pivoted adjacent said record, said piston having operative engagement with said control arm and said track arm whereby movement of said piston pivots said track arm to engage said reproducer with said record and move said control arm to activate the transmitter and receiver of said telephone, said reproducer being connected to deliver any message on said record into said transmitter, a recording device connected to record any message delivered to said receiver, said recorder being energized from said activating circuit, a limit switch, said limit switch being mounted in proximity to said record, means responsive to a predetermined interval of operation of said record to actuate said limit switch.

12. In an automatic telephone attachment a timing device comprising, a record holding device, means for rotating said record holding device, a record mounted on said device, a track arm pivotally mounted adjacent said record, said track arm including a bifurcated track section, means for oscillating said arm about its pivot point, a carriage, a plurality of roller bearing wheels mounting said carriage on said bifurcated track section, guide members on said carriage securing said carriage from displacement from said track section, a reproducer mounted on said carriage said reproducer engaging said record when said arm is in operating position, rotation of said record traversing said carriage along said track section, a limit switch, actuating means for said switch, said actuating means being disposed in the path of movement of said carriage.

13. In an automatic telephone attachment a timing device comprising a record holding device, means for rotating said record holding device, a record mounted on said device, a track arm pivotally mounted adjacent said record, said track arm including a bifurcated track section, means for oscillating said arm about its pivot point, a carriage, a plurality of roller bearing wheels mounting said carriage on said bifurcated track section, guide members on said carriage securing said carriage from displacement from said track section, a reproducer mounted on said carriage said reproducer engaging said record when said arm is in operating position, rotation of said record traversing said carriage along said track section, a limit switch, actuating means for said switch, said actuating means being disposed in the path of movement of said carriage, means operable in response to actuation of said limit switch to tilt said track arm whereby said carriage returns to its initial position.

14. An automatic telephone comprising a support receiving the base of a telephone, a support for the receiver of said telephone, a control arm operatively engaging the switch actuator of said telephone, a switch device energized by transmission of signal energy to said telephone, an actuating circuit energized by said switch device, a holding circuit for maintaining said switch device closed, a recording device connected to record any message transmitted to said telephone receiver, said recording device being energized from said actuating circuit, a hydraulic piston, a pump delivering fluid pressure to said piston, an operative connection between said piston and said control arm, a timing device, an operative connection between said timing device and said piston, predetermined motion of said piston connecting said telephone receiver in operative relation and starting said timing device, a limit switch, said timing device operating said limit switch to deenergize said holding circuit and open said switch device.

15. In an automatic telephone attachment a timing device comprising a fluid cylinder, a piston in said cylinder, means for introducing fluid into said cylinder, a record player, a record mounted in said player, means for rotating said record, a carriage, a track arm, said carriage being mounted on said track arm, a reproducer mounted on said carriage, said track arm being pivoted adjacent said record, said piston being operatively connected to said track arm whereby movement of said piston pivots said track arm to engage said reproducer with said record, said reproducer being connected to deliver any message on said record to said telephone, a limit switch, said limit switch being mounted in proximity to said record, means responsive to a predetermined interval of operation of said record to actuate said limit switch.

VICTOR C. MACK.

References Cited in the file of this patent

UNITED STATES PATENTS

| Number | Name | Date |
|---|---|---|
| 1,993,612 | Lum | Mar. 5, 1935 |
| 2,005,788 | Keiser | June 25, 1935 |
| 2,219,030 | Curtis | Oct. 22, 1940 |
| 2,261,420 | Shively et al. | Nov. 4, 1941 |
| 2,342,503 | Thompson | Feb. 22, 1944 |
| 2,374,842 | Shively et al. | May 1, 1945 |
| 2,539,139 | Jordanoff et al. | Jan. 23, 1951 |
| 2,539,565 | Beatly | Jan. 30, 1951 |
| 2,549,548 | Von Zimmerman | Apr. 17, 1951 |
| 2,597,957 | Sepelak | May 27, 1952 |